US006407994B1

United States Patent
Archer

(10) Patent No.: US 6,407,994 B1
(45) Date of Patent: Jun. 18, 2002

(54) SYSTEM AND METHOD FOR BUNDLING MESSAGES FOR TRANSMISSION IN A TELECOMMUNICATIONS NETWORK

(75) Inventor: Jarrett E. Archer, Celeste, TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/203,788

(22) Filed: Dec. 1, 1998

(51) Int. Cl.⁷ .............................................. H04L 12/56
(52) U.S. Cl. ...................... 370/351; 370/389; 370/428; 370/473; 370/474
(58) Field of Search .................................. 370/389, 470, 370/471, 473, 474, 428, 429, 351, 349, 412, 352–356

(56) References Cited

U.S. PATENT DOCUMENTS

| | | | | |
|---|---|---|---|---|
| 4,334,306 A | * | 6/1982 | Ulug ........................... 370/316 |
| 5,054,020 A | | 10/1991 | Meagher ...................... 370/305 |
| 5,161,194 A | * | 11/1992 | Ujiie ........................... 713/160 |
| 5,237,592 A | * | 8/1993 | Nonami ....................... 375/106 |
| 5,333,135 A | * | 7/1994 | Wendorf ...................... 370/394 |
| 5,467,353 A | * | 11/1995 | Fukuda ........................ 370/524 |
| 5,509,007 A | * | 4/1996 | Takashima et al. .......... 370/391 |
| 5,550,593 A | * | 8/1996 | Nakabayashi ............... 348/465 |
| 5,555,266 A | * | 9/1996 | Buchholz et al. ........... 370/347 |
| 5,706,280 A | | 1/1998 | Kosugi et al. ............... 370/244 |
| 5,710,756 A | * | 1/1998 | Pastenak et al. ............ 370/216 |
| 5,774,467 A | | 6/1998 | Van Der Nood et al. ... 370/428 |
| 5,787,087 A | * | 7/1998 | Visser et al. ................ 370/420 |
| 5,859,580 A | * | 1/1999 | Lien ............................ 370/396 |
| 6,128,278 A | * | 10/2000 | Joffe et al. .................. 370/229 |

FOREIGN PATENT DOCUMENTS

EP 0 566 894 A2 10/1993

* cited by examiner

Primary Examiner—Hassan Kizou
Assistant Examiner—Saba Tsegaye
(74) Attorney, Agent, or Firm—Baker Botts, LLP; V. Lawrence Sewell; Craig A. Hoersten

(57) ABSTRACT

A method for bundling messages for transmission in a telecommunications network includes receiving a first message and a disparate second message. The first and second messages are inserted into a shared packet and transmitted over the telecommunications network in the shared packet.

18 Claims, 4 Drawing Sheets

SYSTEM AND METHOD FOR BUNDLING MESSAGES FOR TRANSMISSION IN A TELECOMMUNICATIONS NETWORK

TECHNICAL FIELD OF THE INVENTION

This invention relates generally to the field of telecommunications, and more particularly to a system and method for bundling messages for transmission in a telecommunications network.

BACKGROUND OF THE INVENTION

Advanced telecommunications networks include a system of trunk lines interconnected by switching points that route calls over the trunk lines. Control points are connected to the switching points in order to provide the switching points with routing and other information to support advanced services demanded by telephone users. Examples of advanced services are free phone (FPH) services such as time dependent routing, calling card (CCD) services, virtual private network (VPN) services, and personal 1-800 services.

The switching points and control points are connected to each other by a messaging system. At the switching points, each message requesting information from a control point is conventionally generated by a user layer and separately packetized at a packet layer. The packet is then framed at a link layer and passed to a physical layer where the message is transmitted on the messaging system to the control point. At the control point, the process is reversed with the message being received by a physical layer and passed to a link layer where the packet is extracted from its transmission frame. The message is extracted from the packet at a packet layer and forwarded to a user layer for processing and reply. Replies are similarly packaged for return transmission to the switching point.

In packaging the message, header and other overhead information is added to the message at the packetizing level and at the framing level. This overhead increases the amount of bandwidth needed to transmit each message and thus can lead to congestion on the messaging system. In addition, the time needed to packetize and frame each message can lead to transmission delays.

SUMMARY OF THE INVENTION

The present invention provides an improved method and system for transmitting messages in a telecommunications network that substantially reduce or eliminate disadvantages and problems associated with prior systems and methods. In particular, the present invention bundles messages together into a shared packet in order to reduce transmission overhead, and thus more efficiently use network bandwidth resources.

In accordance with one embodiment of the present invention, a method for bundling messages for transmission in a telecommunications network includes receiving a first message and a disparate second message. The first and second messages are inserted into a shared packet and transmitted over the telecommunications network in the shared packet.

More particularly, in accordance with a particular embodiment of the present invention, the first and second messages are combined to generate an extended message. The extended message is then inserted into the shared packet for transmission to a remote node of the telecommunications network. At the remote node, the shared packet is received and the extended message is extracted. The first and second messages are distinguished from each other and individually processed. The first and second messages may be serially processed by a single system or separately forwarded to distinct processing systems.

Technical advantages of the present invention include providing an improved method and system for transmitting messages in a telecommunications network. In particular, a plurality of messages are bundled into an extended message. The extended message is inserted into a shared packet for transmission in the telecommunications network. Because the bundled messages share a common overhead, the bandwidth needed to transmit the messages is reduced. Accordingly, traffic and resulting congestion on the telecommunications network is reduced.

Other technical advantages will be readily apparent to one skilled in the art from the following figures, description, and claims.

BRIEF DESCRIPTION OF THE DRAWINGS

For a more complete understanding of the present invention and its advantages, reference is now made to the following brief description, taken in conjunction with the accompanying drawings and detailed description, wherein like reference numerals represent like parts, in which.

DETAILED DESCRIPTION OF THE INVENTION

Figure 1:
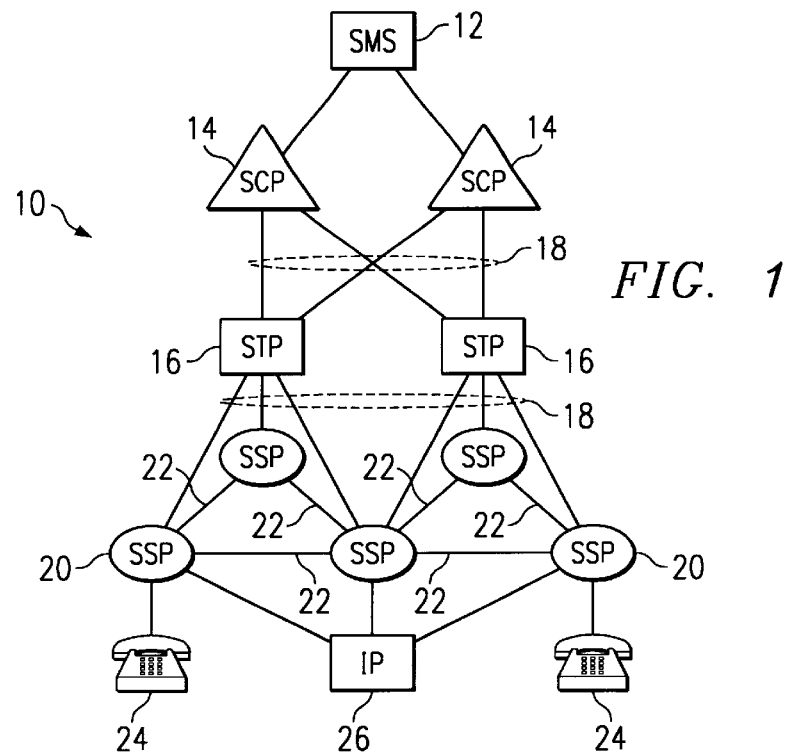
FIG. 1 is a block diagram illustrating an exemplary telecommunications network for use in connection with the present invention.

FIG. 1 is a block diagram illustrating an advanced intelligent network (AIN) 10 for use in connection with the present invention. The advanced intelligent network 10 includes a service management system (SMS) 12 that interfaces with a plurality of service control points (SCP) 14 and a plurality of signal transfer points (STP) 16 via an industry standard protocol, such as X.25. The service management system 12 provides network information, database management, and administrative support for the advanced intelligent network 10. The service management system 12 generally interfaces with service control points 14 for provisioning, database management, service control point application program management, and collecting traffic metering measurement data.

The service control points 14 may be directly linked to the signal transfer points 16 via a signaling system number 7 (SS7) link set 18. The signal transfer points 16 are further coupled through signaling system number 7 link set 18 to one or more service switching points 20, which perform switching and call handling functions in the network 10. The service control points 14 are transaction-based processing systems whose primary responsibility is to respond to queries from service switching points 20 for data needed to complete the routing of a call. The service switching points 20 are part of a publicly-switched telephone network (PSTN) and are coupled to each other via trunks 22 and to telephone service subscribers, which include wire-based telephones, wireless telephones 24, and intelligent peripherals 26.

Figure 2:
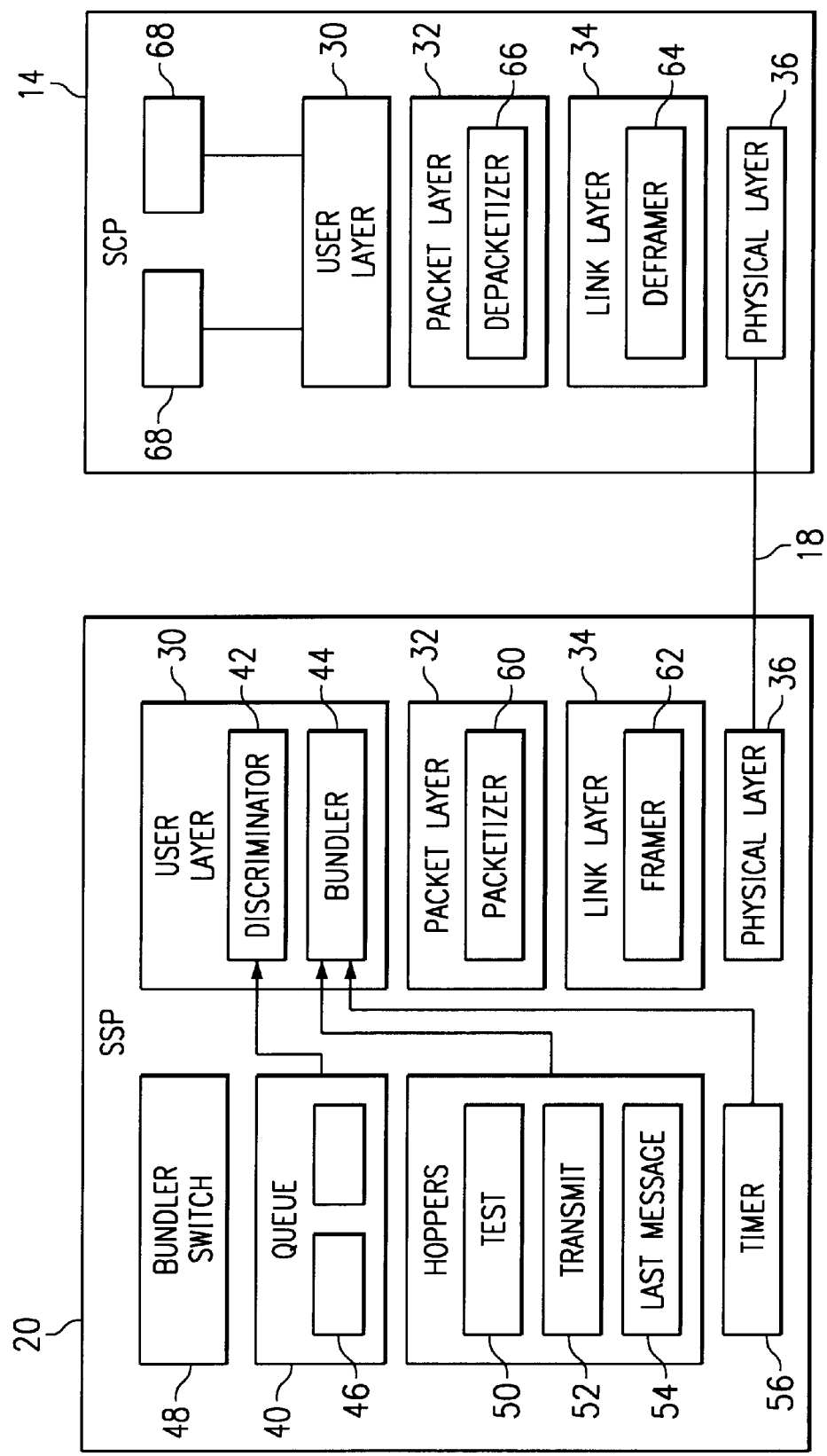
FIG. 2 is block diagram illustrating details of a service switching point and a service control point for the telecommunications network of FIG. 1.

FIG. 2 is a block diagram illustrating details of the service switching point 20 and the service control point 14 for the advanced intelligent network 10. As described in more detail below, the service control point 14 provides routing and other information to the service switching point 20 to support intelligent call routing in connection with advanced services. More particularly, the service switching point 20 generates a message requesting information from the service control point 14 and transmits the message on the signaling network 18 to the service control point 14. The service control point 14 processes the message and replies back over the signaling network 18 to the service switching point 20 with the requested information. The service switching point 20 then uses the provided information to route or otherwise process the call. In this way, the advanced intelligent network 10 processes calls based on dynamic conditions.

The service control point 14 and service switching point 20 include computer software and data that is loaded into system memory and executed by a microprocessor. The computer software and data are generally identified by modules, files, and the like. Elements of system memory are generally identified as queues, hoppers, and the like. It will be understood that the computer software and data may be otherwise combined and/or divided for processing and otherwise stored in a system or other suitable memory without departing from the scope of the present invention. Accordingly, the labels of the modules, files, and memory elements are for illustrative purposes and may be suitably varied.

In one embodiment, the signaling system 18 is implemented in accordance with the signaling system number 7 (SS7) standard. In this embodiment, messaging is implemented between the service switching point 20 and the service control point 14 in accordance with the X.25 standard, published by International Telephone Union (ITU), each of which is incorporated herein by reference. In this embodiment, the service switching point 20 and the service control point 14 each include a user layer 30, a packet layer 32, a link layer 34, and a physical layer 36.

Referring to FIG. 2, the service switching point 20 is a Tandem switch, such as the Megahub 600E manufactured by Alcatel USA, Inc., Class 5 switch, or other suitable switch or network node capable of implementing message bundling via a packet layer protocol for transmission in a telecommunications network. The telecommunications network may include voice, data, a combination of voice and data or any other suitable links. The service control point 14 may be one manufactured by Alcatel USA, Inc.

At the service switching point 20, the user layer 30 includes a message queue 40, a message discriminator 42, and a message bundler 44. The message queue 40 includes one or more discrete messages 46 requesting routing or other information from the service control point 14 needed to complete processing in service switching point 20. The messages are discrete in that they request different functions, operations, or information from the service control point or they are capable of being separately processed by the service control point 14.

The message discriminator 42 determines if the messages 46 should be processed by the message bundler 44 or individually transmitted to the service control point 14. In one embodiment, the message discriminator 42 accesses the message queue 40 to determine if the message 46 to be transmitted is a retransmit message and whether an additional message 46 exists in the message queue 40. The message discriminator 42 accesses a bundler switch 48 to determine if message bundling is enabled for the service switching point 20. In this embodiment, the message discriminator 42 calls the message bundler 44 to process messages 46 in the message queue 40 if message bundling is enabled, the message 46 is not a retransmit message, and the message queue 40 contains an additional message that can be bundled with the current message. If message bundling is disabled, the message 46 is a retransmit message, or no additional message 46 is present in the message queue 40, the message discriminator 42 passes the message 46 directly to the packet layer 32. Thus, the bundler switch 48 allows a service provider to selectively enable and disable message bundling. In addition, even if message bundling is enabled, retransmitted messages are not bundled in order to avoid any delay in retransmitting the message to the service switching point 14. The message discriminator 42 may rely on other suitable criteria to determine whether the message bundler 44 should be called to process messages 46 in the message queue 40.

The message bundler 44 bundles suitable messages 46 into an extended message that can be inserted into a shared packet for transmission to the service control point 14. In one embodiment, the message bundler 44 includes a test hopper 50, a transmit hopper 52, a last message hopper 54, and a timer 56. The hoppers 50, 52, and 54 may be any type of data store capable of storing one or more of the messages 46. As described in more detail below, the hoppers 50, 52, and 54 are used by the message bundler 44 to temporarily store messages 46 in the process of being bundled. The timer 56 limits the maximum amount of time a message 46 may be delayed by bundling operations. Upon expiration of the timer 56 or other suitable event, the message bundler 44 passes bundled messages to the packet layer 32.

The packet layer 32 includes a packetizer 60 that inserts a single message 46 or an extended message into a packet. An extended message is two or more messages 46 that have been bundled together. The packet includes the message 46 or extended message along with a header and other packet overhead. By sharing a packet between two or more messages, overhead is reduced. In addition, packet length is optimized. A shared packet is a packet including two or more discrete messages bundled together.

The link layer 34 includes a framer 62. The framer 62 frames packets generated by the packet layer 32 for transmission to the service control point 14. A packet is framed by adding addressing and other necessary overhead. Thus, a reduction in the number of packets due to packet sharing also reduces frame overhead and optimizes frame length.

The link layer 34 passes frames to the physical layer 36 where they are transmitted over the signaling system 18 to the service control point 14. Because the bundled messages share a common packet and frame overhead, the bandwidth needed to transmit the messages 46 is reduced. Accordingly, traffic and resulting congestion in the signaling system 18 is reduced.

At the service control point 14, transmitted frames are received by the physical layer 36 and passed to the link layer 34. The link layer 34 includes a deframer 64 that extracts a packet from the received frame. The packet is passed to the packet layer 32 which includes a depacketizer 66. The depacketizer 66 extracts the message 46 or extended message from the received packet and passes it to the user layer 30 for processing. For extended messages, the user layer 30 distinguishes between the bundled messages 46 and may serially process the messages 46 or may send one or more of the messages 46 to other processing systems 68. The processing system 68 may be part of the service control point 14 or remote from the service control point 14.

After a message 46 has been processed, the service control point 14 packages frames and transmits a reply message as previously described in connection with the service control point 20. The service control point 20 deframes and depacketizes the reply message using a depacketizer and deframer as previously described in connection with the service control point 14. It will be understood that the service switching point 20 and service control point 14 may communicate using other suitable standard or proprietary protocols without departing from the scope of the present invention.

Figure 3:
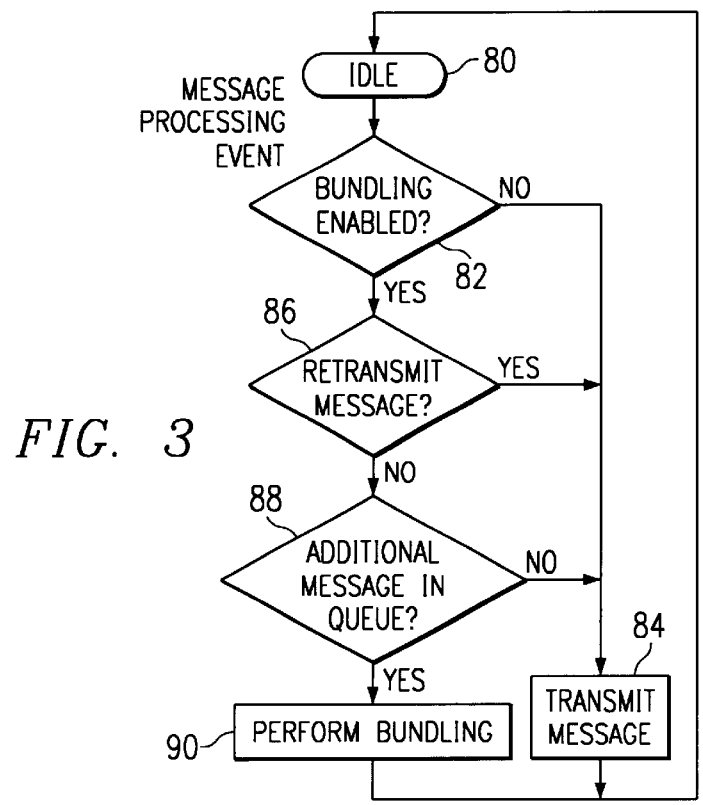
FIG. 3 is a flow diagram illustrating a computer method for determining whether a message should be bundled for transmission in the telecommunications network of FIG. 1.

FIG. 3 is a flow diagram illustrating operation of the message discriminator 42 in accordance with one embodiment of the present invention. As previously described, the message discriminator 42 determines whether a message 46 should be bundled for transmission in the network 10. In this embodiment, the message queue 40 includes messages 46 destined for a common service control point 14. It will be understood that the message queue 40 may include messages 46 destined for disparate service control points 14 and that the message discriminator 42 may segregate and separately process messages 46 based on their destination or may use the destination of messages 46 as a criteria for determining whether the messages 46 should be bundled for transmission in the network 10.

Referring to FIG. 3, the message discriminator 42 operates as a computer process having a number of automatic steps. A step is automatic in that the step is predefined and carried out by the computer process. The step may be immediate or in response to a user action or other suitable event. The process begins at state 80 in which the message discriminator 42 is idle. In response to receiving a message processing event, the discriminator 42 transitions to decisional state 82. The message processing event is the receipt of a message 46 in the message queue 40 or other suitable event.

Next, at decisional step 82, the message discriminator 42 accesses the bundler switch 48 to determine if the message bundling is enabled. If message bundling is not enabled, the No branch of decisional step 82 leads to step 84 in which the message 46 is inserted into its own packet by the packetizer 60, framed by the framer 62, and passed to the physical layer 36 for transmission to the service control point 14.

Returning to decisional step 82, if the bundler is enabled, the Yes branch of decisional step 82 leads to decisional step 86. At decisional step 86, the message discriminator 42 determines if the message 46 is a retransmit message. The transmit status of the message may be determined from information provided with the message 46 or from other suitable sources. If the message is a retransmit message, then its retransmission will not be delayed and the Yes branch of decisional step 86 also leads to step 84. At step 84, as previously described, the message 46 is inserted into its own packet by the packetizer 60, framed by the framer 62, and passed to the physical layer 36 for transmission to the service control point 14.

Returning to decisional step 86, if the message is not a retransmit message, the No branch of decisional step 86 leads to decisional step 88. At decisional step 88, the message discriminator 42 determines whether an additional message 46 is present in the message queue 40. If an additional message 46 is not present, then there is no message 46 to be bundled with the current message 46 and the No branch of decisional step 88 also leads to step 84 where the message is individually packaged and transmitted to the service control point 14. If an additional message is present in the message queue 40, the Yes branch of decisional step 88 leads to step 90. At step 90, the message discriminator 42 calls the message bundler 44 to process the messages 46. Step 90 and step 84 both return to the idle state 80 wherein the message discriminator 42 is idle and waits for additional messages 46 to be received by the message queue 40.

Figure 4A:
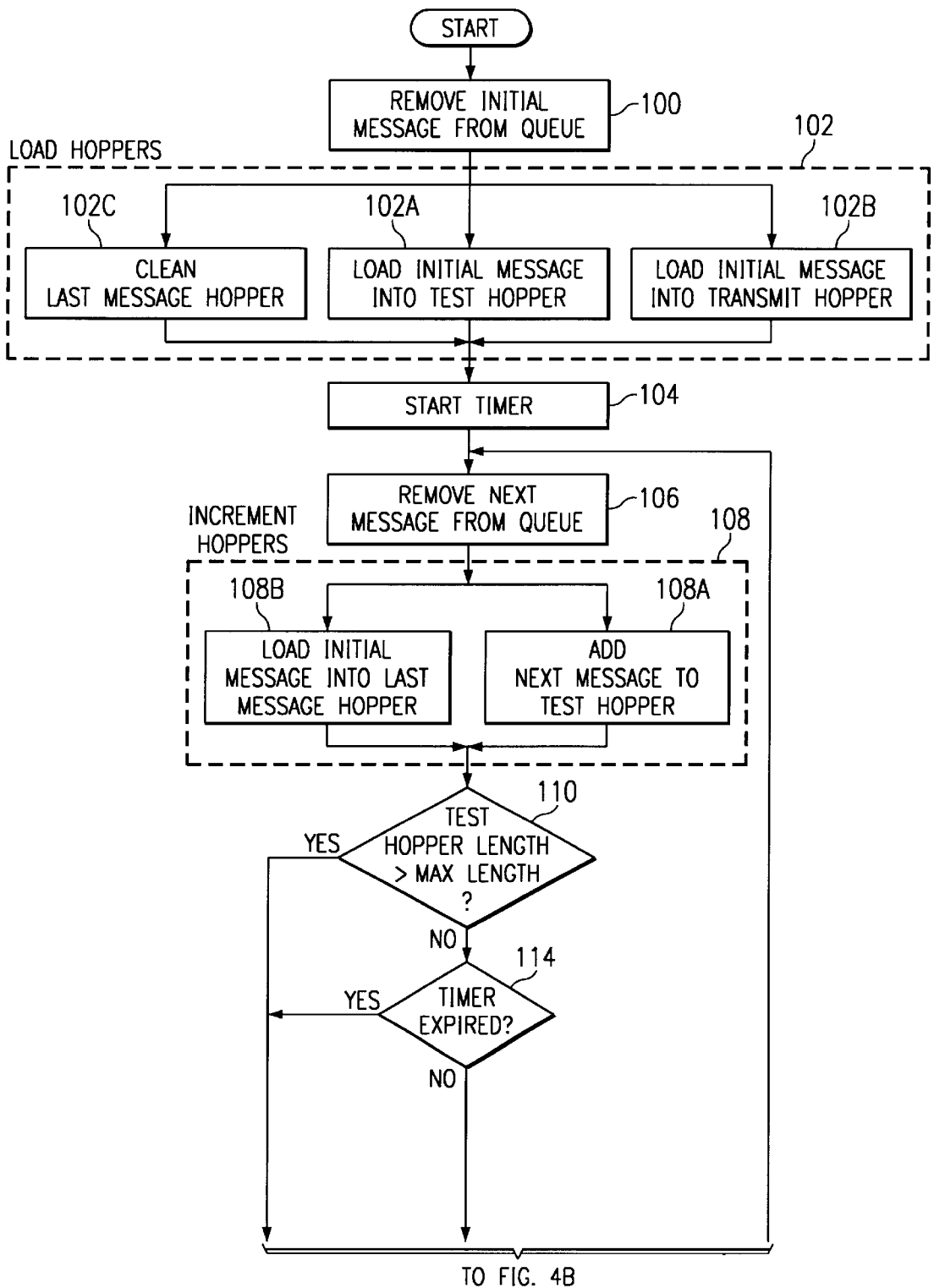
FIG. 4 is a flow diagram illustrating a computer method for bundling messages for transmission in the telecommunications network of FIG. 1.
Figure 4B:
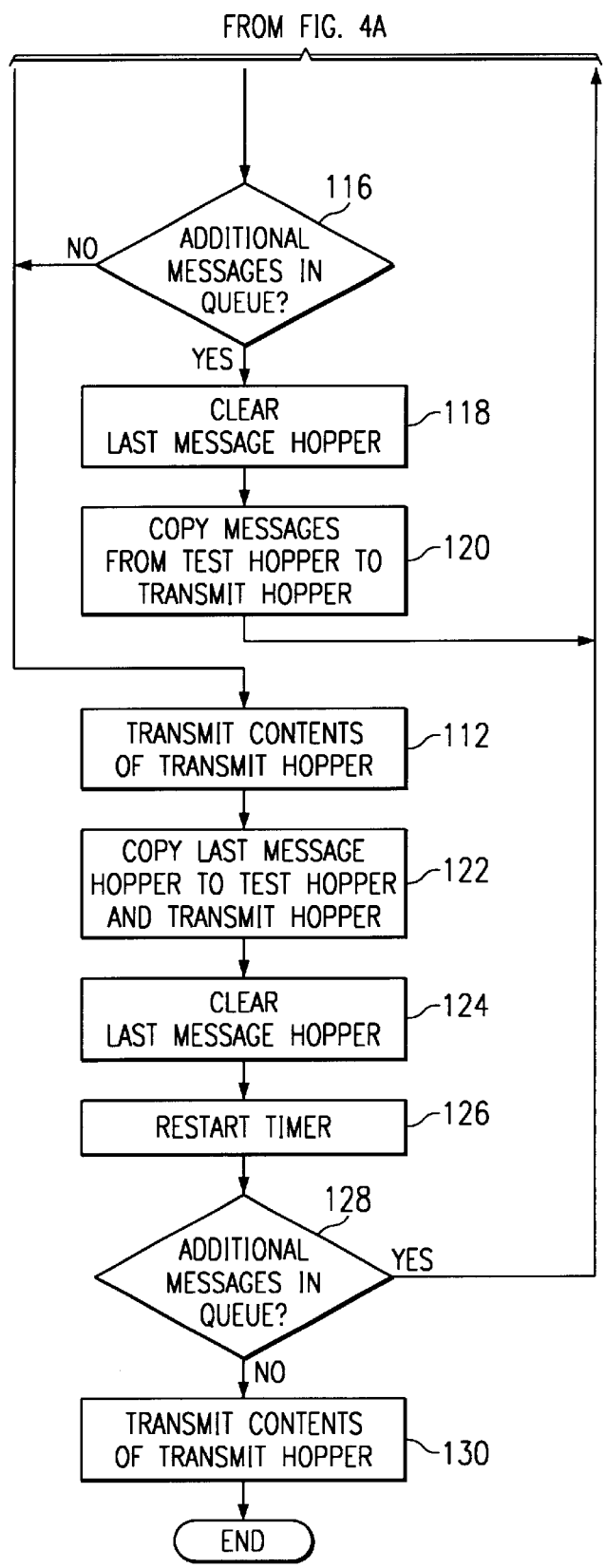

FIG. 4 is a flow diagram illustrating operation of the message bundler 44 in accordance with one embodiment of the present invention. In this embodiment, the message bundler 44 uses the test hopper 50, transmit hopper 52, and last message hopper 54 to combine messages and to temporarily store combined messages to determine their suitability as an extended message that can be inserted into a shared packet for transmission over the network 10. It will be understood that the message bundler 44 may otherwise suitably determine if messages 46 are capable of being combined into an extended message.

Referring to FIG. 4, the message bundler 44 operates as a computer process having a number of automatic steps. The process begins at step 100 in which the message bundler 44 removes an initial message 46 from the message queue 40. Next, at step 102, the message bundler 44 initially loads the test, transmit, and last message hoppers 50, 52, and 54. In particular, at step 102a the initial message 46 is loaded into the test hopper 50. At step 102b, the initial message 46 is loaded into the transmit hopper 52. The last message hopper is cleared at step 102c. The test and transmit hoppers 50 and 52 may be previously cleared by the message bundler 44 or cleared during the loading process. Steps 102a, 102b, and 102c all lead to step 104.

At step 104, the message bundler 44 starts the timer 56. As previously described, the timer 56 represents a maximum amount of time that a message 46 will be delayed in an attempt to bundle it with one or more additional messages 46. Preferably, a service provider may customize the length of the timer 56 depending on the needs of the service provider, operating criteria for the service switching point 20 or the network 10, and the like.

Proceeding to step 106, the message bundler 44 removes a next message 46 from the message queue 40. At step 108, the bundler 44 increments the hoppers 50 and 54. In particular, at step 108a, the next message 46 is added to the test hopper 50 to generate an extended message. The message is extended in that it includes two or more discrete messages 46. At step 108b, the next message is loaded into the last message hopper 54, which was previously cleared. Steps 108a and 108b each lead to decisional step 110.

At decisional step 110, the message bundler 44 determines if the extended message in the test hopper 50 is greater than a specified length. In one embodiment, the specified length is the maximum length of a message that can be inserted into a packet for transmission in the telecommunications network 10. If the extended message is greater than the maximum length, the message bundler 44 generates a transmission event and the Yes branch of decisional step 110 leads to step 112. At step 112, the contents of the transmit hopper 52 are transmitted to the service control point 14. The contents may be a single message 46 or an extended message. In either case, the message is transmitted by passing the message to the packet layer for packetizing, the packet to the link layer for framing, and the frame to the physical layer 36 for transmission.

Returning to decisional step 110, if the length of the extended message in the test hopper 50 is not greater than the maximum length, the No branch of decisional step 110 leads to decisional step 114. At decisional step 114, the message bundler 44 determines if the timer 56 is expired. If the timer is expired, then transmission of the initial message will not be further delayed. Accordingly, the message bundler 44 generates a transmission event and the Yes branch of decisional step 114 leads to step 112 where, as previously described, the contents of the transmit hopper 52 are transmitted to the service control point 14.

Returning to decisional step 114, if the timer 56 has not expired, additional time exists to continue the bundling process and the No branch of decisional step 114 leads to a decisional step 116. At a decisional step 116, the message bundler 44 determines if an additional message 46 exists in the message queue 40. If an additional message 46 is not present in the message queue 40, there is no other message to bundle with the present message. Accordingly, the message bundler 44 generates a transmission event and the No branch of decisional step 116 leads to step 112 where the contents of the transmit hopper 52 are transmitted to the service control point 14.

Returning to decisional step 116, if an additional message is present in the message queue 40, the Yes branch of decisional step 116 leads to step 118. At step 118, the message bundler 44 clears the next message hopper 54. Next, at step 120, the contents of the transmit hopper 52 are replaced with the contents of the test hopper 50 because it has been determined that the messages currently existing in the test hopper 50 may be bundled together for transmission in the network 10.

Step 120 returns to step 106 wherein a next message 46 is removed from the message queue 40. As previously described, the message bundler 44 then compares the length of messages in the test hopper 50 to a maximum length, determines if the timer 56 has expired, and if additional messages 46 are in the message queue 40 until the length of the test message is greater than the maximum length, the timer 56 has expired, or no additional messages 46 remain in the message queue 40. In response to these events, a transmission event is generated and the single or extended message in the transmit hopper 52 is transmitted to the service control point 14 at step 112. It will be understood that the message bundler 44 may include other or different transmission events capable of indicating that a current message, whether single or extended, should be transmitted without further bundling processing.

After the message or messages in the transmit hopper 52 have been transmitted at step 112, the last message 46 which was removed from the message queue 40, added to the test hopper 50 for testing purposes, but not added to the transmit hopper 52 for transmission, is copied from the last message hopper 54 to the test and transmit hoppers 50 and 52. Previous messages in the test and transmit hoppers 50 and 52 may be cleared prior to copying the last message into the hoppers 50 and 52 or cleared during the copying process. Next, at step 124, the last message hopper 54 is cleared. The timer 56 is restarted at step 126.

Proceeding to decisional step 128, the message bundler 44 again determines if additional messages 46 are present in the message queue 40. If additional messages 46 are present, the Yes branch of decisional step 128 returns to step 106. At step 106, as previously described, the next message 46 is removed from the message queue 40 and it is determined if that message may be bundled with the last message that was not previously transmitted. Returning to decisional step 128, if an additional message 46 is not present in the message queue 40, the No branch of decisional step 128 leads to step 130. At step 130, the contents of the transmit hopper 52 are transmitted to the service control point 14 as previously described in connection with step 112.

Step 130 leads to the end of the process at which time the message queue 40 is empty and no additional messages 46 are in need of transmission. Messages previously in the message queue 40 have been bundled to the extent possible and inserted into shared packets to reduce required bandwidth for communications between the service switching point 20 and the service control point 14. Accordingly, network traffic and resulting congestion are reduced.

Although the present invention has been described with several embodiments, various changes and modifications may be suggested to one skilled in the art. It is intended that the present invention encompass such changes and modifications as fall within the scope of the appended claims.

What is claimed is:

1. A method for bundling messages for transmission in a telecommunications network, comprising:

generating a first message for transmission over the telecommunications network, the first message including a request for information to route a current call;

generating a disparate second message for transmission over the telecommunications network, the second message including a request for information to route the current call or a different call;

inserting the first and second messages into a shared packet; and transmitting the first and second messages in the telecommunications network in the shared packet;

determining a status for message bundling prior to inserting the first and second messages into the shared packet;

proceeding with inserting the first and second messages into the shared packet in response to an enabled status for message bundling; and inserting the first and second messages into separate packets and individually transmitting the packets in the telecommunications network in response to a disabled status for message bundling.

2. The method of claim 1, further comprising:

inserting the shared packet into a shared frame for transmission in the telecommunications network.

3. The method of claim 1, wherein inserting the first and second messages into the shared packet includes:

combining the first message and the second message into an extended message; and inserting the extended message into the shared packet.

4. The method of claim 3, further comprising:

receiving the shared packet at a remote node of the telecommunications network;

extracting the extended message from the shared packet;

distinguishing between the first and second messages; and individually processing the first and second messages.

5. The method of claim 1, wherein the shared packet is an X.25 packet.

6. The method of claim 1, further comprising:

receiving the shared packet at a remote node of the telecommunications network;

extracting the first and second messages from the shared packet; and individually processing the first and second messages.

7. The method of claim 5, further comprising:

separately forwarding the first and second messages to distinct processing systems.

8. The method of claim 1, further comprising:

determining a status of the first message prior to inserting the first and second messages into the shared packet;

proceeding with inserting the first and second messages into the shared packet in response to an initial transmit status of the first message; and inserting the first message into its own packet and transmitting the packet in the telecommunications network in response to a retransmit status of the first message.

9. The method of claim 1, further comprising:

determining if the second message has been received;

proceeding with inserting the first and second messages into the shared packet in response to receipt of the second message;

inserting the first message into its own packet and transmitting the packet in the telecommunications network in response to the second message not being received.

10. A method for bundling messages for transmission in a telecommunications network, comprising:

removing a first message from a message queue storing messages having requests for routing information for transmission in the telecommunications network;

loading the first message into a test hopper;

loading the first message into a transmit hopper;

starting a timer;

removing a second message from the message queue;

loading the second message into a last message hopper;

adding the second message into the test hopper;

repeatedly removing a next message from the message queue, replacing the contents of the last message hopper with the next message, replacing the contents of the transmit hopper with the contents of the test hopper, and adding the next message to the contents of the test hopper until a transmission event is generated; and in response to the transmission event, inserting the contents of the transmit hopper into a shared packet for transmission in the telecommunications network.

11. The method of claim 10, further comprising in response to the transmission event:

replacing the contents of the transmit hopper with the content of the last message hopper;

replacing the contents of the test hopper with the content of the last message hopper;

restarting the timer;

returning to the act of removing the next message from the next message queue in response to the presence of an additional message in the message queue; and inserting the contents of the transmit hopper into a packet for transmission in the telecommunications network in response to the absence of an additional message in the message queue.

12. The method of claim 10, further comprising:

generating a transmission event in response to the length of the contents in the test hopper exceeding a specified length.

13. The method of claim 12, wherein the specified length is a maximum length for a message that can be inserted into a packet for transmission in the telecommunications network.

14. The method of claim 10, further comprising:

generating a transmission event in response to the timer expiring.

15. The method of claim 10, further comprising:

generating a transmission event in response to the absence of an additional message in the message queue.

16. The method of claim 10, further comprising:

generating a transmission event in response to the length of the contents in the test hopper exceeding a specified length, the timer expiring, and the absence of an additional message in the message queue.

17. The method of claim 10, wherein the shared packet is an X.25 packet.

18. The method of claim 10, further comprising:

determining whether the message is a retransmit message prior to removing the message from the message queue; and inserting the message into its own packet and transmitting the packet in the telecommunications network in response the message being a retransmit message.

* * * * *